United States Patent [19]
Kim et al.

[11] Patent Number: 5,851,420
[45] Date of Patent: Dec. 22, 1998

[54] PROCESS FOR MANUFACTURING GRANULAR SODIUM PERCARBONATE

[75] Inventors: Sang Ryul Kim; Chong Yun Kwag, both of Seoul; Hwan Kee Heo, Inchoen; Jong-Pill Lee, Seoul, all of Rep. of Korea

[73] Assignee: Oriental Chemical Industries, Seoul, Rep. of Korea

[21] Appl. No.: 609,635

[22] Filed: Mar. 1, 1996

[51] Int. Cl.[6] .............................. C11D 3/395; C11D 7/12
[52] U.S. Cl. .............................. 252/186.27; 252/186.28; 252/186.29; 423/415.2; 510/302; 510/309; 510/367; 8/111
[58] Field of Search .................. 252/186.27, 186.29, 252/186.28; 510/314, 315, 302, 309, 367; 423/415.2; 8/111

[56] References Cited

U.S. PATENT DOCUMENTS

| | | | |
|---|---|---|---|
| H1513 | 1/1996 | Murch et al. | 252/546 |
| 3,917,663 | 11/1975 | Kegelart et al. | 423/415 P |
| 4,171,280 | 10/1979 | Maddox et al. | 252/186 |
| 4,179,394 | 12/1979 | Dillenburg | 252/186 |
| 4,385,008 | 5/1983 | Hignett | 260/502 R |
| 4,526,698 | 7/1985 | Kuroda et al. | 252/99 |
| 4,756,845 | 7/1988 | Sugawasa et al. | 252/102 |
| 4,966,762 | 10/1990 | Pfeffer et al. | 423/415 P |
| 5,346,680 | 9/1994 | Roesler et al. | 423/274 |
| 5,424,060 | 6/1995 | Hauschild | 424/52 |
| 5,599,781 | 2/1997 | Haeggberg et al. | 510/220 |

*Primary Examiner*—Joseph K. McKane
*Assistant Examiner*—Deana Baxam
*Attorney, Agent, or Firm*—Finnegan, Henderson, Farabow, Garrett & Dunner, L.L.P.

[57] ABSTRACT

This invention relates to a process of manufacturing granular sodium percarbonate and more particularly, to a process of a stable granular sodium percarbonate detergent composition having an excellent solution velocity when added to water, comprising the following steps: hydrogen peroxide solution is directly sprayed to unpurified anhydrous sodium carbonate to produce granular sodium percarbonate followed by the addition of a stabilizer having a new composition in a reactor or fluidized bed dryer, then recycling sodium percarbonate particles which are of nonuniform particle size back into the process for continuous manufacturing.

13 Claims, No Drawings

PROCESS FOR MANUFACTURING GRANULAR SODIUM PERCARBONATE

FIELD OF THE INVENTION

This invention relates to a process of manufacturing granular sodium percarbonate and more particularly, to a process of a stable granular sodium percarbonate detergent composition having an excellent solution velocity when added to water, comprising the following step: hydrogen peroxide solution is directly sprayed to unpurified anhydrous sodium carbonate to produce granular sodium percarbonate followed by the addition of a stabilizer having a new composition in a reactor or fluidized bed dryer.

BACKGROUND OF THE INVENTION

When sodium percarbonate is dissolved in water, it is decomposed into sodium carbonate and hydrogen peroxide. Its final decomposition product, a peroxide bleaching agent, has been widely used in that said agent is not detrimental to the environment and can be used safely for dyed clothing. In particular, the peroxide bleaching agent, exhibiting an excellent bleaching power when added to cooled water, have more advantage than other bleaching agents requiring promoters. In order to obtain sufficient bleaching effects within a short washing time, the solution velocity to water should be markedly improved.

Currently, a powder detergent composition containing sodium percarbonate as one of the bleaching ingredients has been used. Nevertheless, the reason why sodium percarbonate cannot be widely used is that in case of a detergent containing zeolite as a builder, zeolite facilitates the decomposition of sodium percarbonate. In view of such circumstances, the maintenance of stability in high moisture when mixed with zeolite and improvement in the solution velocity of cooled water has been desired in order to increase the demand of sodium percarbonate as a bleaching detergent composition.

The method related to improving the solution velocity of sodium percarbonate to water includes its thermal treatment. U.S. Pat. No. 3,953,350 reported that sodium percarbonate is decomposed at a high temperature to form hydrogen peroxide as the primary decomposition product and further decomposition generates oxygen and water as the secondary decomposition product. Therefore, the thermal treatment has sodium percarbonate hold oxygen molecules in its crystal lattice. And the sodium percarbonate releases the oxygen molecules in order to foam when it is based in water. Notwithstanding this, said method is uneconomical at the cost of active oxygen and failed to improve the solution velocity of sodium percarbonate.

In general, one factor to impede the stability of sodium percarbonate may be found in a decomposition induced by impurities of transition metal including iron contained in sodium percarbonate. In order to prevent the decomposition of sodium percarbonate by such impurities, therefore, the common method is to react purified raw material, sodium carbonate, with hydrogen peroxide or stabilize sodium percarbonate with the addition of a stabilizer in the process of manufacturing sodium percarbonate.

The manufacture of sodium percarbonate is largely divided into wet process and dry process. The wet process is that after reacting sodium carbonate with hydrogen peroxide in aqueous vehicles, the resulting crystals of sodium percarbonate, so formed, are dried, while the dry method is that after contacting sodium carbonate aqueous solution with hydrogen peroxide solution in spray, sodium percarbonate, so formed, is dried in heat wind.

To improve a low yield of sodium percarbonate in the wet process, it should be essential to make the recycling on mother liquids including purification process. However, the modification of particles requires an additional process of growing the formed crystals of sodium percarbonate so that its manufacturing process is more complicated.

On the other hand, the dry method has a disadvantage in that the size adjustment of sodium percarbonate particles is difficult since sodium percarbonate formed from the mutual spraying of both sodium carbonate aqueous solution and hydrogen peroxide solution is dried.

In view of these circumstances, the general method to stabilize sodium percarbonate is that with the addition of salts to sodium carbonate aqueous solution, impurities contained in sodium percarbonate are precipitated prior to the reaction for their removal or a chelating agent, forming complex compound with metals as impurities, is added to sodium percarbonate for blocking the decomposition mechanism of hydrogen peroxide by metals.

Besides, there are other conventional methods to manufacture sodium percarbonate wherein a) under the flowing hot air, small particles of anhydrous sodium carbonate are sprayed by hydrogen peroxide solution and dried simultaneously, and b) monohydrate of sodium carbonate or sodium carbonate hydrated with 10~25% water is reacted with hydrogen peroxide solution.

However, said methods have a limited scope in selecting sodium carbonate and is uneconomical in that available sodium carbonate should be purified prior to reaction.

In view of these circumstances, efforts have been made to develop a novel chelating agent for the sustained stability of sodium percarbonate and also to improve the process of manufacturing sodium percarbonate.

To comply with these trends, there have been various methods to making a coating on the surface of sodium percarbonate particles so as to prevent the decomposition and to sustain its stability under a high moisture. The European Patent No. 567,140 introduced the typical compound used as an coating material such as borate including boron, silicate in alkali metal, and macromolecule compound. However, since said compounds have poor solubility in water, the coating on sodium percarbonate should require a careful consideration in preventing the precipitation of raw materials and fabricating the equipment thereto. Further, the selection of boron compound is not appropriate since boron is now in dispute over its harm to the human body. Meantime, the German Patent No. 2,133,566 reported a process of manufacturing sodium percarbonate in which heat wind-flowing anhydrous sodium carbonate is sprayed by hydrogen peroxide. In this case, the sodium carbonate particles should be smaller. This method is suitable for batch production and the sodium percarbonate particles should be determined based on the size of crude sodium carbonate particles.

SUMMARY OF THE INVENTION

Therefore, the primary object of this invention is to provide a process of manufacturing sodium percarbonate characterized by the following: when the detergent composition in powder form and sodium percarbonate are contacted, the anti-moisture power of sodium percarbonate is strengthened. Also, in order to facilitate the generation of active oxygen by maximizing the dissolution of sodium percarbonate when added to water, the contact of hydrophilic detergent composition and sodium percarbonate particles are blocked in a manner to protect sodium percarbonate from the direct attack of water molecules in the air without the separation of sodium percarbonate particles by a coating, and the disintegration of granular sodium percarbonate in water may be improved, thus faciltating the solution velocity.

DETAILED DESCRIPTION OF THE INVENTION

The present invention provides a process of manufacturing sodium percarbonate in which sodium carbonate is charged, agitated in the reactor and sprayed by hydrogen peroxide solution under the air flow. Then, the sodium percarbonate formed at a constant temperture is circulated and dried continuously. In case of said sodium carbonate, unpurified anhydrous sodium carbonate is used and nonuniform sodium percarbonate is recycled for a continuous manufacture.

The present invention is described in more detail as set forth hereunder.

The present invention is designed to provide a process of manufacturing a useful granular sodium percarbonate as a detergent composition with uniform particle size by using unpurified anhydrous sodium carbonate. First, unpurified anhydrous sodium carbonate in powder form is agitated in a reactor followed by the spray of hydrogen peroxide solution to form the sodium percarbonate particles.

Hence, to prevent the temperature increase of a reaction mixture induced by exothermic reaction and the slurry state of reaction mixture by moisture, the input of air at the start of the reaction is made simultaneously to control the temperature and moisture within a reactor. The temperature within a reactor should be in the range of 20° to 80° C. When the temperature is lower than 20° C., the reaction cannot be completed and in case of exceeding 80° C., the decomposition may occur. In an attempt to control the temperature within a reactor, the input air temperature should be in the range of from −5° to 20° C. and the common method is to supply the air at a low temperature. The amount of air is preferred to comprise 0.5 to 3 m$^3$/min per 1 m$^3$ based on the capacity of a reactor, since the water content of formed sodium percarbonate may be maintained at the level of constant amount and the stability of sodium percarbonate may be also improved.

Owing to a low air temperature and agitation, the small-sized sodium percarbonate is united to form the sodium percarbonate particles with a constant size. The slightly wet sodium percarbonate formed is continuously passed through a fluidized bed dryer to give the dried sodium percarbonate particles with a certain size. Excessively larger lump or micro-particles are passed into a sifter for separation. While larger particles are pulverized, small particles are recharged into a reactor for their recycling so as to improve the yield of final products. Hence, the content of nonuniform sodium percarbonate recycling into a reactor through a sifter is 10 to 80 weight parts in proportion to 100 weight parts of sodium carbonate within a reactor.

The content of active oxygen in the formed granular sodium percarbonate is more than 13.5% and there is little loss in hydrogen peroxide.

As mentioned in the above, the present invention may be commercially applicable in that unpurified anhydrous sodium carbonate in powder state is directly used in the reaction and a high yield of sodium percarbonate in granular form may be continuously manufactured.

Meantime, the present invention provides a stable sodium percarbonate in granular state as a detergent composition by inducing the physiochemical changes in the inside or on the surface of sodium percarbonate through the continuous or simultaneous addition of a stabilizer in the process of manufacturing sodium percarbonate, which passed through a reactor and fluidized bed dryer.

According to this invention, a stabilizer selecting from one or more compounds of the following groups may be used, together with magnesium sulfate.

1) Water glass expressed by the following chemical formula and sodium silicate prepared in granule or powder state, and its aqueous solution

$Na_2O \; nSiO_2 \; x \; H_2O$

Wherein, n is 1 to 4 and x is 0 to 9.

2) Higher fatty acid and ester of carbohydrate or polyol, and a compound where polyoxyethylene is added to said ester 3) Pyridine compound and its salts having one or more carboxyl groups as a substituent 4) Aromatic or aliphatic amines and its salts having one or more sulfonic acid groups or carboxyl groups Hence, the detailed description of said stabilizer is as follows:

First, with reference to 1) water glass expressed by the following chemical formula and sodium silicate prepared in granule or powder state, and its aqueous solution, sodium silicate is referred to as metasilicate(n=1) and sodium disilicate(n=2) based on the molar ratio(n) of $SiO_2$ and $Na_2O$. Now that said crystal hydrides have been prepared and marketed in granule or powder state, their purchase is easily available and they can be directly used in the process of manufacturing sodium percarbonate.

The sodium silicate in granule or powder state used in the manufacturing process is mixed when sodium percarbonate particles are grown or sticks to the surface of the particles. When the sodium silicate aqueous solution where sodium silicate is dissolved in water, is sprayed to sodium percarbonate, there is an advantage in that its homogeneous mixture may be available in the inside or on the surface of sodium percarbonate with an easy adjustment of molar ratio and concentration. However, there is a disadvantage in that the drying of sodium percarbonate requires more energy compared with sodium silicate in solid state. In this context, when water glass is employed, sodium percarbonate in a certain concentration should be added in the manufacturing process, in consideration of its viscosity and solubility.

According to the purposes of this invention, the surface of sodium percarbonate, which is not wrapped with a glassy film, is coated with a mixing material wherein sodium percarbonate particles in its inside or on the surface are changed in its structure and when mixed with a detergent composition, its stability in storage is sustained and better improvement in disintegration of sodium percarbonate in water may increase its solution velocity. Thus, both sodium silicate in solid state and water glass may be employed.

Second, with reference to a higher fatty acid and ester of carbohydrate or polyhydric alcohol, and a compound where polyoxyethylene is added to said ester, said ester is a compound produced from the reaction between alcohol or carbohydrate, having hydroxyl group and fatty acid. Its excellent water solubility and bio-decomposition does not cause any environment-related problems and with the mixture of sodium percarbonate, said ester is very useful in manufacturing granular sodium percarbonate having excellent solubility.

For example, said ester includes higher fatty acid and glycerin or sorbitan ester, and polyethyleneglycol ester. The carbohydrate-forming ester, may be selected from one or more monosaccharides, disaccharides and polysaccharides and used independently in the process of manufacturing, thus producing the same effect as said ester.

Further, sodium percarbonate having excellent stability may be manufactured with the use of mannitol.

In line with the structure of ester employed in this invention, alcohol is a polyol having 2 to 10 hydroxyl groups and higher fatty acid is a saturated or unsaturated fatty acid having 10 to 18 carbons. In case of higher fatty acid and polyol added with polyoxyethylene, the added molar number of polyoxyethylene is in the range of 3 to 60.

Meantime, since a trace amount of transition metal present in sodium percarbonate plays a role in facilitating the decomposition of hydrogen peroxide, a metal ion sequestrant should be used in the process of manufacturing sodium percarbonate so as to mask harmful metals. The stabilizer in sodium percarbonate indicates said metal ion sequestrant, which is employed without fail in the process of manufacturing sodium percarbonate.

It has been widely recognized that polyphosphonic acid and its salts are very excellent metal ion sequestrants, which plays a big role in sustaining the stability of sodium percarbonate but their eutrophication problem has been raised. Thus, some countries have regulated its use.

In view of these situations, the present invention provides an compound having functional groups to exhibit an excellent affinity to transition metal to replace the conventional polyphosphonic acid and its salts, such as pyridine compounds having carboxyl group as a substituent, and aromatic or aliphatic amines having one or more sulfonic acid group or carboxyl group.

Third, as for pyridine compound and its salts having one or more carboxyl groups as a substituent, and aromatic or aliphatic amines and its salts having one or more sulfonic acid groups or carboxyl groups, their typical compounds include picolinic acid and taurine. Picolinic acid is a pyridine compound having one carboxyl group as a substituent, while taurine is a compound having both sulfonic acid group and amino group at both terminals of ethylene.

Said groups of compound ranging from 1) to 4) may be used in the process of manufacturing sodium percarbonate, together with well-known stabilizers.

In order to manufacture sodium percarbonate in granular state of the present invention which is stable as a detergent composition and well dissolved in cooled water, one or more compounds selecting from the groups of 1), 2), 3) and 4) in the process of manufacturing sodium percarbonate is/are used in a reactor or fluidized bed dryer, together with magnesium sulfate heptahydride. During the reaction between sodium carbonate and hydrogen peroxide, small amounts of said compound play a role as a stabilizer and after the formation of sodium percarbonate particles, heavy amounts of said compound also plays a role as a coating agent. Therefore, a compound added to a reactor or fluidized bed dryer differ based on its kind and amounts.

According to this invention, the compositions of compounds belonging to the groups of 1), 2), 3) and 4) and magnesium sulfate heptahydrate to be mixed in the inside or on the surface of sodium percarbonate is preferred to comprise the following: in proportion to 100 weight parts of sodium carbonate, 0.01 to 3.0 weight parts of magnesium sulfate heptahydrate as Mg basis of magnesium sulfate comprises, 0.1 to 5.0 weight parts of water glass or sodium silicate as $SiO_2$ basis belonging to 1) group, 0.1 to 5.0 weight parts of ester or carbohydrate belonging to 2) group, 0.1 to 3.0 weight parts of pyridine compound and its salts belonging to 3) group and 0.1 to 3.0 weight parts of aromatic or aliphatic amines and salts belonging to 4) group.

In case of said compound, a minimum amount and maximum amount are established in the concept of an stablizer and coating agent, respectively.

Magnesium sulfate heptahydrate and a compound belonging to 1) group are used to stabilize hydrogen peroxide or sodium percarbonate to be formed but too excessive amounts of said materials may cause the agglomeration of sodium percarbonate particles or reduce their solubility.

Further, appropriate amounts of the compounds belonging to 2) group contribute much to improvements in stability of sodium percarbonate and solution velocity. However, when 0.1 weight parts of said compound are used in proportion to sodium carbonate, they are not effective in the improvement of solution velocity and in excess of using 5.0 weight parts, the aparent specific gravity of sodium percarbonate is reduced.

Besides, the compounds belonging to the groups of 3) and 4) play a role as a metal ion sequestrant and it is sufficient to use necessary amounts to mask the activities of trace amounts of metal ion present in sodium carbonate.

In case of magnesium sulfate heptahydrate and each group of compounds used in the process of manufacturing sodium percarbonate, therefore, the appropriate compounds and compositions within the scope of said contents should be reviewed, while considering their economical aspect and physical properties of related products.

Meantime, some solid compounds such as magnesium sulfate heptahydrate or sodium silicate, and sodium carbonate, which are used and dissolved in a reactor continuously or periodically, may be sprayed together with hydrogen peroxide.

At the reaction entry of hydrogen peroxide with sodium carbonate or after the formation of sodium percarbonate particles, the compounds belonging to each group of 1), 2), 3) and 4) are dissolved in water glass, continuously sprayed and dried in a reactor or fluidized bed dryer, thus enabling it to be uniformly applied in the inside or on the surface of sodium percarbonate.

The present invention is an economical process of manufacturing sodium percarbonate in that sodium percarbonate manufactured by the recycling process to obtain uniform particles with the addition of said stabilizer as aforementioned has the following advantages: a) its stability in storage is excellent, b) it is readily dissolved in a cooled water and c) unpurified sodium carbonate may be directly charged into a reactor.

In addition, more advantageous aspect of this invention is that any solid compound including a liquid state may be directly used as an stablizer without dissolution process.

This invention is explained in more detail by the following examples, but the claims are not limited to these examples.

EXAMPLE 1

To a 30 l reactor equipped with an agitator and air-blowing apparatus, anhydrous sodium carbonate at 9 kg/hr and sodium metasilicate, nonahydrate at 100 g/hr were charged and then, 55% (w/w) hydrogen peroxide solution in 0.65 weight % of magnesium sulfate heptahydrate was sprayed at 7.51 kg/hr.

Hence, the temperature within a reactor was maintained at 40° C. and in order to control the water content of the formed sodium percarbonate in wet state to 14%, the air volume and temperature were adjusted to 15 to 60 l/min and 5° to 20° C., respectively. The wet sodium percarbonate was passed from the reactor to a fluidized bed dryer continuously and dried under heat wind of 130° C. for 1 hr.

In such a manner as above, the continuous operation for 10 hrs was conducted to give a total volume(126 kg) of sodium percarbonate at mean volume of 12.6 kg/hr, containing 14.3% mean active oxygen and 1.0% moisture. The size distribution of manufatured sodium percarbonate showed that particles exceeding 800 μm comprised 15%, 65% with particles of 250 to 800 μm and 20% with particles of less than 250 μm. The yield was 94%.

Then, in such a matter as in the above, anhydrous sodium carbonate at 5.4 kg/hr and sodium metasilicate nonahydrate at 60 g/hr were placed in the reactor followed by the addition of sodium percarbonate particles, so formed, having more than 800 μm or less than 250 μm at 3.6 kg/hr. Then, hydrogen peroxide in 0.65 weight % of magnesium sulfate heptahydrate was sprayed to said mixture at 2.48 kg/hr and dried under the same reaction conditions as above.

In such a manner as above, the continuous operation for 7 hrs was conducted to give a total volume(78 kg) of sodium percarbonate at mean volume of 12.6 kg/hr, containing 14.5% of mean active oxygen and 0.9% of water. The size distribution and yield of manufactured sodium percarbonate were given in Table 1.

COMPARATIVE EXAMPLE 1

Wet method

While agitating 40.38 kg of a mother liquid consisting of 11.08 weight % of sodium carbonate and 2.96 weight % of hydrogen peroxide, sodium carbonate at 28 kg/hr, 55% hydrogen peroxide solution at 21.22 kg/hr, sodium metasilicate nonahydrate at 0.75 kg/hr, and magnesium sulfate heptahydrate at 0.16 kg/hr were added to said mixture.

While maintaining the temperature within a reactor at 10° C., the reaction was made for 15 mins and thereafter, the temperature was reduced to 5° C. and then, left for 40 mins. The sodium percarbonate produced from the reactor centrifuged and the remaining solution was recycled to the reactor for the next reaction. The sodium percarbonate, so formed, was dried at a fluidized bed dryer and cooled.

Through the repeated operations 5 times in the same manner as above, sodium percarbonate (total volume: 39 kg, mean volume per operation: 7.8 kg) containing mean active oxygen of 13.1% and 2.7% of water was obtained. The size distribution and yield of manufactured sodium percarbonate were given in Table 1.

TABLE 1

| Classification | EXAMPLE 1 | COMPARATIVE EXAMPLE 1 |
|---|---|---|
| Mean aparent specific gravity (g/cc) | 1.01 | 0.49 |
| Mean content of active oxygen (%) | 13.5 | 13.1 |
| Mean size distribution (%) | | |
| More than 800 μm | 12 | 9 |
| 800 ~ 250 μm | 78 | 16 |
| Less than 250 μm | 10 | 75 |
| Yield (%) | 97 | 85 |

EXAMPLE 2

The manufacture of sodium percarbonate including its drying was conducted using a reactor and fluidized bed dryer manufactured by a laboratory. In a reactor, a 500 ml round-shaped flask was equipped with a mechanical stirrer, and with a blade of semicircular plastic fabricated in such a matter to scratch the flask floor.

Hydrogen peroxide solution was infused by a dropping funnel and during the reaction with sodium carbonate, the air within a flask was inhaled out by aspirator, thus resulting in the same effects as a cooling with the input of air into a reactor.

1.4 g of sodium metasilicate pentahydrate belonging to 1) group was added to 100 g of anhydrous sodium carbonate stirred at 200 rpm and well mixed. Then, 0.6 g of magnesium sulfate heptahydrate and 0.9 g of mannitol belonging to 2) group was dissolved in 68.6 g of 70% hydrogen peroxide solution and the mixture was added dropwise to the mixture of sodium carbonate for about 2 hrs. After the reaction was completed, the agitation velocity was reduced to about 100 rpm and the slightly wet sodium percarbonate was dried in a reactor. Hence, the reactor was installed in a water batch and the temperature within a reactor was maintained at 50° to 60° C. Alternatively, the slightly wet sodium percarbonate was moved to a convection dry oven for drying.

EXAMPLE 3 to 6

In the same manner as in EXAMPLE 2, sodium percarbonate was manufactured except for change of the compounds which were added to 68.6 g of 70% hydrogen peroxide solution instead of mannitol, as shown in the following Table 2.

EXAMPLE 7

In the same manner as in EXAMPLE 2, sodium percarbonate was manufactured. In this example, however, 0.6 g of magnesium sulfate heptahydrate and 0.25 g of sucrose belonging to 2) group dissolved in 80 g of 60% hydrogen peroxide was added to the mixture of sodium carbonate dropwise for about 2 hrs.

EXAMPLE 8 to 10

In the same manner as in EXAMPLE 7, sodium percarbonate was manufactured. As shown in the following Table 3, however, the stabilizer composition was changed using various kinds of compounds selected from 2) group instead of sucrose.

COMPARATIVE EXAMPLE 2

In the same manner as in EXAMPLE 2, 100 g of sodium carbonate and 1.4 g of sodium metasilicate pentahydrate were charged into a reactor. Then, 0.6 g of magnesium sulfate heptahydrate was dissolved in 80 g of 60% hydrogen peroxide solution to give sodium percarbonate.

EXAMPLE 11 to 12

In the same manner as in EXAMPLE 2, sodium percarbonate was manufactured. As shown in the following Table 4 and 5, however, sodium carbonate was mixed with magnesium sulfate heptahydrate or some compounds selected from the groups of 1) through 4), or added to the reacting hydrogen peroxide solution for the manufacture of sodium percarbonate. Hence, related amounts of magnesium sulfate heptahydrate or some compounds selected from the groups of 1) through 4), which was mixed in the inside or surface of sodium percarbonate did not exceed 3% level based on the weight of sodium percarbonate.

EXAMPLE 13 to 14

The manufacture and drying of sodium percarbonate was made using a reactor and fluidized bed dryer fabricated by a laboratory. An inner fluidized bed dryer was manufactured by connecting Buchner funnel attached with 125 ml Frit as inner effective volume and evaporation flask. The flowing state of sodium percarbonate was maintained under high-purity nigtrogen gas flow, heated at 50° to 60° C. through a reduced-pressure tube duct of flask. If deemed necessary, the upper part of said apparatus was fabricated in such a manner to allow the spraying of quantative solution.

In the same manner as in EXAMPLE 2, sodium percarbonate was manufactured. As shown in the following Table 4 and 5, however, sodium carbonate was mixed with magnesium sulfate heptahydrate or some compounds selected from the groups of 1) through 4), or added to the reacting hydrogen peroxide solution for the manufacture of sodium percarbonate. Hence, related amounts of magnesium sulfate heptahydrate or some compounds selected from the groups of 1) through 4).

Magnesium sulfate heptahydrate or some compounds selected from the groups of 1) through 4) were added to the reacting mixture of sodium carbonate and hydrogen peroxide. After the reaction was completed, the first dried sodium percarbonate in a reactor was moved to a fluidized bed dryer.

A solution of magnesium sulfate heptahydrate or some compounds selected from a group of 1) to 4) were sprayed to sodium percarbonate in a flowing state percarbonate. Hence, related amounts of magnesium sulfate heptahydrate or some compounds selected from the groups of 1) through 4), which was mixed in the inside or surface of sodium percarbonate did not exceed 3% level based on the weight of sodium percarbonate. Further, the concentration of said aqueous solution was determined not to impede the spraying.

Experiment 1: Measurement for the Stability of Sodium Percarbonate 2.7 g of sodium percarbonate, manufactured in accordance with said EXAMPLE 2 to 6, was well mixed with 0.3 g of zeolite to infuse into a 20 ml vial, wrapped with aluminum foil and left in a convection dryer at 90° C. for 2 hrs.

Then, the residual rate of active oxygen was measured. The aluminum foil was pierced to make 3 holes of needle in order to induce the air. The stability of manufactured sodium percarbonate was measured based on the aforementioned method and its results were given in Table 2.

TABLE 2

| Classification | Added compound | Active oxygen (%) | Residual rate of active oxygen(%) |
|---|---|---|---|
| EXAMPLE 2 | Mannitol | 13.3 | 92.8 |
| EXAMPLE 3 | Diaminocyclohexane Tetraacetic acid | 13.1 | 91.9 |
| EXAMPLE 4 | Salicylic acid sodium salt | 13.7 | 91.0 |
| EXAMPLE 5 | Dipicolic acid | 13.4 | 90.1 |
| EXAMPLE 6 | Alkylpolyglycoside | 13.6 | 90.3 |

Experiment 2: Measurement for Dissolution Time of Sodium Percarbonate

A 1 l beaker was charged with 1 l of tap water and placed on water bath at 20° C. to induce the thermal equlibrium. Then, 5 g of sodium percarbonate, so manufactured in accordance with said EXAMPLE 7 to 10 and COMPARATIVE EXAMPLE 2, was charged to the floor of a beaker for an even dispersion. By the naked eye, the time was measured until sodium percarbonate was completely dissolved.

The dissolution time of manufactured sodium percarbonate was measured based on said method and its results were given in the following Table 3.

TABLE 3

| Classification | Added compound | Aective oxygen (%) | Disssolution time (min) |
|---|---|---|---|
| EXAMPLE 7 | Sucrose 0.25 g | 13.9 | 120 |
| EXAMPLE 8 | sugar ester 0.20 g | 13.2 | 110 |
| EXAMPLE 9 | Mannitol 0.40 g | 13.2 | 120 |
| EXAMPLE 10 | Alkylpolyglycoside 0.25 g | 13.6 | 140 |
| COMPARATIVE EXAMPLE 2 | | 13.6 | 210 |

Experiment 3: Measurement for the Storage Stability of Sodium Percarbonate

In the following two procedures, sodium percarbonate was stored in a thermostat/hygrostat(relative humidity: 80%, temperature: 30° C.) for 4 weeks and the residual rate of active oxygen was measured.

(1) 2.7 g of sodium percarbonate and 0.3 g of zeolite 4A were well mixed, charged with a 20 ml polypropylene container and wrapped with an aluminum foil. The aluminum foil was pierced to make 3 holes of needle in order to induce the air.

(2) 2.25 g of a currently marketed detergent(Beet, Cheil F&C) containing Zeolite 4A of 15 to 25% was well mixed with 0.75 g of sodium percarbonate 0.75 g, charged with a 20 ml polypropylene container and plugged.

The storage stability on sodium percarbonate manufactured in accordance with said EXAMPLE 11 to 14 and said marketed product (COMPARATIVE EXAMPLE 3 to 5) was measured and its results by said item (1) and (2) procedure were given in the following 4 and 5, respectively.

TABLE 4

| Classification | Added compound (weight part) | Active oxygen (%) | Dissolution time (min) |
|---|---|---|---|
| EXAMPLE 11 | Magnesium sulfate heptahydrate(1), Sugar ester(0.5) | 13.1 | 68.1 |
| EXAMPLE 12 | Sodium silicate aqueous solution(SiO$_2$/Na$_2$O=3.4)(2), Magnesium sulfate heptahydrate(0.1) | 13.3 | 67.7 |
| EXAMPLE 13 | Sodium silicate aqueous solution(SiO$_2$/Na$_2$O=3.4)(2), Magnesium sulfate heptahydrate(1.0) | 13.4 | 71.9 |
| EXAMPLE 14 | Sodium metasilicate pentahydrate(3), Sucrose(2.0) | 13.0 | 63.6 |
| COMPARATIVE EXAMPLE 3* | | 13.2 | 30.0 |
| COMPARATIVE EXAMPLE 4** | | 12.2 | 45.7 |
| COMPARATIVE EXAMPLE 5*** | | 13.0 | 50.5 |
| EXAMPLE 11 | Magnesium sulfate heptahydrate(1) Sugar ester(0.5) | 13.1 | 76.5 |
| EXAMPLE 12 | Sodium silicate aqueous solution(SiO$_2$/Na$_2$O=3.4)(2), Magnesium sulfate heptahydrate(0.1) | 13.3 | 80.9 |
| EXAMPLE 13 | Sodium silicate aqueous solution(SiO$_2$/Na$_2$O=3.4)(2) Magnesium sulfate heptahydrate(1.0) | 13.4 | 77.8 |

TABLE 4-continued

| Classification | Added compound (weight part) | Active oxygen (%) | Dissolution time (min) |
|---|---|---|---|
| EXAMPLE 14 | Sodium metasilicate pentahydrate(3), Sucrose(2.0) | 13.0 | 82.1 |
| COMPARATIVE EXAMPLE 3* | | 13.2 | 57.0 |
| COMPARATIVE EXAMPLE 4** | | 12.2 | 53.5 |
| COMPARATIVE EXAMPLE 5*** | | 13.0 | 39.0 |

*Mitsubishi Chem. product
**Degussa product
***Solvay-Interox product

What is claimed is:

1. A process for manufacturing sodium percarbonate which comprises initially charging a reactor with solid sodium carbonate and at least one material selected from:

(a) a sodium silicate aqueous solution expressed by the chemical formula $Na_2O, n(SiO_2), x(H_2O)$ wherein, n is 1 to 4 and x is 0 to 9 or sodium silicate in granule or powder form and its aqueous solution;

(b) a higher fatty acid or ester thereof with a carbohydrate or polyol or a composition where a polyoxyethylene is added to said ester;

(c) a pyridine compound or its salts having one or more carboxyl groups as a substituent; or (d) an aromatic or aliphatic amine and its salts having one or more sulfonic acid groups or carboxyl groups;

spraying the sodium carbonate with hydrogen peroxide solution under flowing air, at a temperature from about 20° C. to about 80° C.; and stirring the reactants to thereby obtain sodium percarbonate; continuously drying the sodium percarbonate obtained; and wherein nonuniform particle size sodium percarbonate formed by the process is recycled for continuous manufacturing.

2. A process according to claim 1, wherein the amount of said air is about 0.5 to about 3 m³/min per 1 m³ based on the capacity of said reactor.

3. A process according to claim 1, wherein 10 to 80 parts by weight of said nonuniform particle size sodium percarbonate are recycled to a reactor for every 100 parts by weight of said sodium carbonate.

4. A process according to claim 1 wherein 0.01 to 3.0 parts by weight of said magnesium sulfate based on Mg are added to 100 parts by weight of said sodium carbonate.

5. A process according to claim 4 wherein crystalline or amorphous sodium silicate is employed in a granular or powder form, or in an aqueous solution and 0.1 to 5.0 parts by weight of said sodium silicate as SiO₂ are added to 100 parts by weight of said sodium carbonate.

6. A process according to claim 1 wherein a saturated or unsaturated fatty acid having 10 to 18 carbons is used as a higher fatty acid, together with a polyol having 2 to 10 hydroxyl groups.

7. A process according to claim 1 wherein the molar number of said polyoxyethylene is in the range from 3 to 60.

8. A process according to claim 1 wherein said carbohydrates are monosaccharides, disaccharides or polysaccharides.

9. A process according to claim 1 wherein 0.1 to 5.0 parts by weight of said fatty acid materials are added to 100 parts by weight of sodium carbonate.

10. A process according to claim 1 wherein 0.1 to 3.0 parts by weight of said pyridine materials are added to 100 parts by weight of sodium carbonate.

11. A process according to claim 1 wherein 0.1 to 3.0 parts by weight of said amine materials are added to 100 parts by weight of sodium carbonate.

12. A process according to claim 1, herein said solid sodium carbonate is unpurified anhydrous sodium carbonate.

13. A process according to claim 1, wherein said at least one material together with magnesium sulfate is charged into a reactor or fluidized bed dryer, and wherein said sodium percarbonate is manufactured by oxidation of sodium carbonate.

* * * * *